United States Patent [19]

Lisankie et al.

[11] 4,012,191
[45] Mar. 15, 1977

[54] SYSTEM FOR RECOVERING HEAT FROM THE EXHAUST GASES OF A HEAT GENERATOR

[75] Inventors: Jerome Richard Lisankie, Morris Plains; George Kratsios, Verona, both of N.J.

[73] Assignee: Foster Wheeler Energy Corporation, Livingston, N.J.

[22] Filed: June 18, 1975

[21] Appl. No.: 588,076

[52] U.S. Cl. .............................. 432/179; 432/223; 110/56; 122/DIG. 2; 237/55; 165/DIG. 1; 98/58; 34/86

[51] Int. Cl.$^2$ .......................................... F28F 1/10

[58] Field of Search .......... 432/179, 223, 214, 220, 432/72, 200, 203, 205; 237/54, 55; 122/DIG. 2, 20 B; 165/DIG. 1; 266/14; 34/86, 35; 98/58

[56] References Cited

UNITED STATES PATENTS

| | | | |
|---|---|---|---|
| 1,633,759 | 6/1927 | Breese, Jr. | 122/20 B |
| 2,540,598 | 2/1951 | Ruiz | 432/220 |
| 2,627,398 | 2/1953 | Hepburn | 432/179 |
| 3,693,883 | 9/1972 | Stigger | 98/58 |
| 3,813,039 | 8/1974 | Wells | 110/56 |
| 3,829,285 | 8/1974 | Beck | 432/223 |

*Primary Examiner*—John J. Camby
*Assistant Examiner*—Henry C. Yuen
*Attorney, Agent, or Firm*—Marvin A. Naigur; John E. Wilson; Warren B. Kice

[57] ABSTRACT

A system for recovering heat from the exhaust gases of a heat generator in which a conduit connects the heat generator to the discharge stack and a fan forces the hot gases from the heat generator to the stack. A heat recovery unit removes heat from the gases as they pass through the conduit and an inner stack is disposed in the discharge stack and has an inlet in communication with the conduit and an outlet for discharging the gases. An additional conduit connects the heat generator to the discharge stack for permitting a natural flow of the gases from the heat generator to the discharge stack during inoperation of the fan.

4 Claims, 1 Drawing Figure

U.S. Patent　　Mar. 15, 1977　　4,012,191
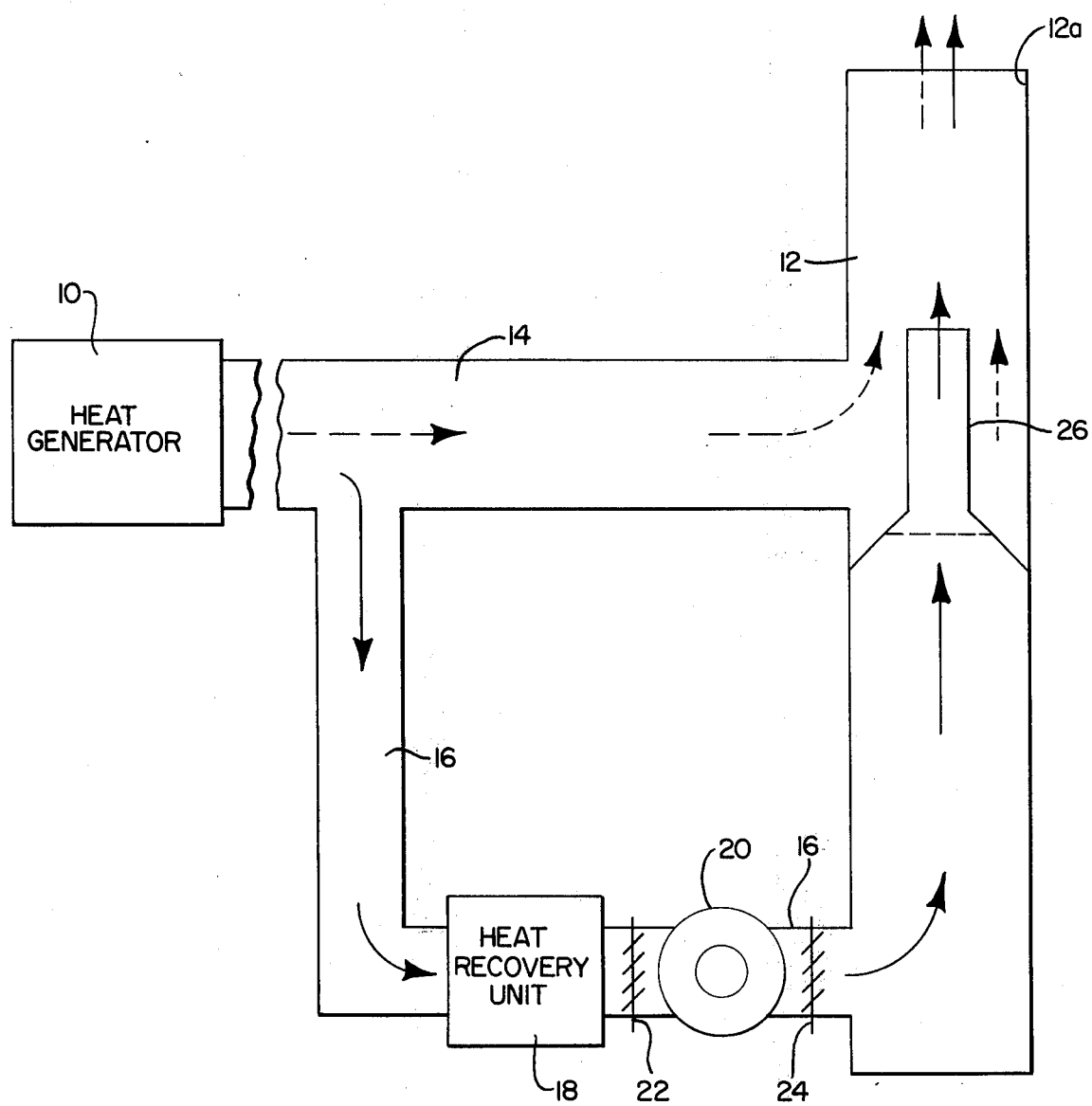

SYSTEM FOR RECOVERING HEAT FROM THE EXHAUST GASES OF A HEAT GENERATOR

BACKGROUND OF THE INVENTION

This invention relates to a heat recovery system and, more particularly, to such a system in which heat is recovered from hot gases passing from a heat generator to a discharge stack.

In power plants, chemical plants, oil refineries, and the like, a relatively high volume of hot exhaust gases are formed as the exhaust products of associated equipment, such as fired heaters, boilers, gas turbines, diesel engines, furnaces, and the like. Since these gases are at a very high temperature, various type of systems have been devised to remove the heat from the gases before they are discharged to atmosphere. These systems are commonly referred to as waste heat recovery systems and are usually in the form of heaters or boilers which utilize the heat from the gases to produce saturated or superheated steam, or to heat water, air, gas, glycol, oil and other fluids.

In these systems, a waste heat recovery unit is connected to a conduit connecting the hot gas outlet of the heat generator to a discharge stack for discharging the gases into the atmosphere. The hot gases are usually drawn through the conduit, and therefore the heat recovery unit, by a fan, and the heat recovery unit includes a plurality of tubes which passes and external fluid in a heat exchange relation with the hot gases.

However, in these types of arrangements, severe problems are encountered when it becomes impossible to draw the hot gases through the conduit due to failure of the fan or the heat recovery unit, for example, since it is extremely important that the hot gases be accommodated and thus avoid shut-down of the heat generator. It has been suggested to provide a bypass conduit connecting the heat generator to the discharge stack, and an operator controlled damper in the bypass conduit at the main entrance to the discharge stack. However, this arrangement is not without problems since the damper requires operator control which often results in delays in opening, and is subject to failure due to its continuous exposure to the hot gases. The use of a bypass conduit without a damper creates another problem during normal operation of the system, since the flow of gases through the discharge stack tends to pull the relatively hot gases from the heat generator directly through the bypass conduit and into the stack without recovering the heat from the gases.

SUMMARY OF THE INVENTION

It is therefore an object of the present invention to provide a system for recovering heat from the exhaust gases of a heat generator which utilizes a bypass conduit connecting the heat generator to a discharge stack without the necessity of a damper in the conduit.

It is a further object of the present invention to provide a system of the above type which minimizes the danger of the gases passing through the main conduit and discharge stack from pulling the heated gases through the bypass conduit during normal operation of the system.

Toward the fulfillment of these and other objects, the system of the present invention comprises a discharge stack, a conduit connecting the heat generator to the discharge stack, fan means to force the gases from the heat generator to the discharge stack and a heat recovery unit connected to the conduit for removing heat from the gases before passage to the discharge stack. An inner stack is disposed in the discharge stack and has an inlet in communication with the conduit, and an outlet for discharging the gases, and an additional conduit connects the heat generator to the discharge stack and registers with the discharge stack at a location upstream from the discharge end of the inner stack.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawing which is a schematic representation of the system of the present invention.

DESCRIPTION OF THE PREFERRED EMBODIMENT

Referring specifically to the drawing which depicts an examplary embodiment of the system of the present invention, the reference numeral 10 refers in general to a heat generator which is understood to include any type of equipment which provides an exhaust product in the form of heated gases, such as a fired heater, boiler, gas turbine, diesel engine, or furnace, and the like. A discharge stack 12 is provided in proximity to the heat generator 10 and consists of an essentially vertical conduit which has an upper open end 12a for discharging gas products into atmosphere or into auxiliary equipment, as will be described later.

A conduit 14 connects the hot gas outlet of the heat exchanger 10 directly to the discharge stack 12, and a conduit 16 connects the conduit 14 at a location proximate to the heat recovery unit 10 to the lower portion of the stack 12.

A heat recovery unit, shown in general by the reference numeral 18, is disposed in the conduit 16 for removing the heat from the hot gases passing through the conduit 16. As indicated above, the heat recovery unit may be in the form of a waste heat boiler or a water heater and operates to pass a fluid, such as water, through tubes, or the like, in a heat exchange relation with the hot gases passing through the conduit 16 to transfer the heat from the gases to the fluid, which is then passed to an external location for further treatment. Since this type of unit is of a conventional design, it will not be described in any further detail.

A fan 20 is disposed in the conduit 16 between the heat recovery unit 18 and the discharge stack 12 for drawing the hot gases from the heat generator 10 and passing them into the lower portion of the discharge stack. A damper 22 is provided in the conduit 16 between the heat recovery unit 18 and the fan 20, and a damper 24 is provided in the conduit 16 between the fan 20 and the discharge stack 12, to control the flow of the gases through the conduit 16.

An inner stack 26 is formed in the discharge stack 12 at a point proximate the connection between the latter discharge stack and the conduit 14, so that the relatively cool gases passing upwardly through the discharge stack 12 are isolated from the conduit 14 and therefore will not pull the hot gases directly from the heat recovery unit 10 through the conduit 14 and into the discharge stack.

In normal operation, operation of the fan 20 will cause a great majority of the exhaust gases from the heat generator 10 to pass through the conduit 16, the heat recovery unit 18, and into the lower portion of the discharge stack 12 under control of the dampers 22 and 24. The gases then pass upwardly through the inner stack 26 and outwardly through the open end 12a of the stack 12 to atmosphere, as shown by the solid flow arrows in the drawing. During this operation, only a minimal amount of the heated gases pass through the conduit 14 directly to the discharge stack since the inner stack 26 isolates the relatively cool discharge gases passing upwardly through the stack 12 from the conduit 14 and thus minimizes any pulling of the heated gases from the heat generator 10 directly to the discharge stack 12, as discussed above.

Should the operation of the fan 20 fail, or if the fan is shut down due to difficulties with the heat recovery unit 18, or the like, then the hot gases exhausting from the heat generator 10 will pass directly through the conduit 14 by natural draft and into the discharge stack 12 where they pass through the annulus around the inner stack 26 and upwardly to atmosphere, as shown by the dashed flow arrows in the drawing. Thus, without any action on the part of operating personnel, the flow of the hot exhaust gases from the heat generator 10 to the discharge stack 12 continues without interruption and without disturbing the operation of the heat generator. Also, the above is achieved while insuring a minimal amount of drawing of the hot gases directly from the heat generator 10 to the discharge stack 12 through the conduit 14 in normal of the fan unit.

Of course, variations of the specific construction and arrangement of the system disclosed above can be made by those skilled in the art without departing from the invention as defined in the appended claims.

What is claimed is:

1. A system for recovering heat from the exhaust gases of a heat generator, comprising a discharge stack, first conduit means connecting said heat generator to said discharge stack, fan means to force said gases from said heat generator through said first conduit means to said discharge stack, a heat recovery unit connected to said first conduit means for removing heat from said gases before passage to said discharge stack, an inlet opening formed in said discharge stack at a location downstream from the connection between said first conduit means and said discharge stack, second conduit means connected to said heat generator and to said opening for providing an unobstructed direct passage between said heat generator and said discharge stack, and an inner stack disposed in said discharge stack and extending for the length of said opening in a spaced relation thereto for isolating the gases from said first conduit means from the gases from said second conduit means during the flow of said gases through said discharge stack and passed said opening.

2. The system of claim 1, further comprising a damper means disposed in said first conduit means for controlling the flow of gases through said first conduit means.

3. The system of claim 2, wherein said damper means comprises a damper located between said heat recovery unit and said fan means, and an additional damper located between said fan means and said discharge stack.

4. The system of claim 1, wherein a majority of the gases from said heat generator pass through said first conduit means during operation of said fan, said gases flowing through said second conduit means during inoperation of said fan.

* * * * *